US012592971B1

(12) United States Patent     (10) Patent No.:     US 12,592,971 B1
Tu et al.                        (45) Date of Patent:     Mar. 31, 2026

(54) CONTROLLING NETWORK ACCESS USING RISK LEVELS DETERMINED BY USER ACTIVITY AND PROGRAM VERSIONING

(71) Applicant: Calix, Inc., San Jose, CA (US)

(72) Inventors: Youwu Tu, Nanjing (CN); Jie Zhang, Nanjing (CN)

(73) Assignee: Calix, Inc., San Jose, CA (US)

( * ) Notice: Subject to any disclaimer, the term of this patent is extended or adjusted under 35 U.S.C. 154(b) by 121 days.

(21) Appl. No.: 18/485,985

(22) Filed: Oct. 12, 2023

(51) Int. Cl.
    *H04L 9/40*          (2022.01)

(52) U.S. Cl.
    CPC ............ *H04L 63/20* (2013.01); *H04L 63/105* (2013.01); *H04L 63/1416* (2013.01); *H04L 63/1433* (2013.01)

(58) Field of Classification Search
    CPC ... H04L 63/20; H04L 63/105; H04L 63/1416; H04L 63/1433
    See application file for complete search history.

(56)                References Cited

U.S. PATENT DOCUMENTS

| | | | |
|---|---|---|---|
| 9,282,114 B1 * | 3/2016 | Dotan .................... | G06F 21/577 |
| 10,362,046 B1 * | 7/2019 | Srinivasan .......... | H04L 63/1433 |
| 2010/0058432 A1 * | 3/2010 | Neystadt ................. | G06F 21/57 |
| | | | 726/1 |
| 2020/0287910 A1 * | 9/2020 | Zerrad .................. | H04L 63/102 |
| 2020/0304503 A1 * | 9/2020 | Zerrad .................... | H04L 63/10 |
| 2022/0201031 A1 * | 6/2022 | Choudha ............. | H04L 63/1425 |
| 2022/0210173 A1 * | 6/2022 | Katmor ............... | H04L 63/1416 |
| 2024/0048610 A1 * | 2/2024 | S ............................ | G06F 16/219 |
| 2024/0388606 A1 * | 11/2024 | Mihajlovic ............. | H04L 63/20 |
| 2025/0119449 A1 * | 4/2025 | Shankar ............. | H04L 63/1433 |

* cited by examiner

*Primary Examiner* — Cheng-Feng Huang
(74) *Attorney, Agent, or Firm* — Staniford Tomita LLP

(57)                    ABSTRACT

A component controlling network access between a client and a server using application software versions to determine a risk level of the client. The component uses a first set of programs for negotiation with the client if the risk level is high, wherein the first set of programs includes programs with high security level, and it uses a second set of programs for negotiation with the client if the risk level is not high, wherein the second set of programs includes programs with high security level and programs with low security level. The component may utilize secure network protocols for communication between the client and server, and may be included as a gateway in a zero trust network access (ZTNA) system.

18 Claims, 6 Drawing Sheets

100

100

Entity 102 Component 102

Client 101

Proxy Server 103
Proxy Client 104

Server 105

200                                                        201 determining a risk level of the client 202                                                        203 using a first set of programs for
negotiation with the client if the risk
the level is high using a second set of programs for
negotiation with the client if the risk
risk level is not high

500

600

CONTROLLING NETWORK ACCESS USING RISK LEVELS DETERMINED BY USER ACTIVITY AND PROGRAM VERSIONING

TECHNICAL FIELD

Embodiments relate to the field of network access, and more particularly, to controlling network access.

BACKGROUND

Data centers and large-scale networks are constantly under threat from various types of cyberattacks such as data theft, hacking, spyware, Man-in-the-Middle attacks, and so on. Strictly controlling network access is important to ensure that system resources (data, applications, processes, etc.) stay adequately protected. Protocols such as secure shell (SSH) and secure sockets layer/transport layer security (SSL/TLS) are widely used in data centers to provide secure management, remote access to resources, software patches and updates.

Imposing strict security controls typically adds management overhead and may force compromises with respect to network accessibility and even performance, in some cases. Additionally, the continuous versioning of application programs, security protocols, and so on, such as through software updates and fixes, may render older and outdated software more vulnerable to security breaches, thus exposing the system to increased risk of attack. User activities and device configuration/use can also dictate levels of access to secure networks.

It is therefore important to provide security enhancements to accommodate different activity use cases and overcome vulnerabilities due to software versioning and to maintain flexible connectivity for security protocols without incurring excessive overhead and/or performance degradation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF DRAWINGS

In the following drawings like reference numerals designate like structural elements. Although the figures depict various examples, the one or more embodiments and implementations described herein are not limited to the examples depicted in the figures.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can be combined, occur, or be performed simultaneously, at the same point in time, or concurrently.

It should be noted that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Figure 1:
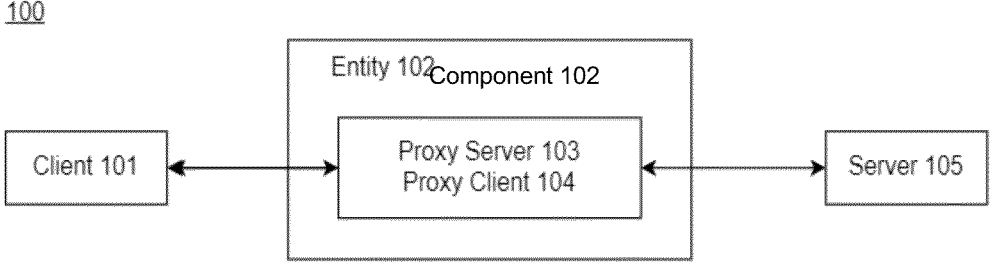
FIG. 1 is a block diagram illustrating an apparatus for controlling network access, under some embodiments.

FIG. 1 is a block diagram illustrating an example embodiment of an apparatus for controlling network access. In illustration 100, component 102 is configured between client 101 and server 105. Component 102 is an intermediary device and acts as a proxy server 103 when it is communicating with client 101, and component 102 acts as a proxy client 104 when it is communicating with server 105. In one example, component 102 is a man in the middle (MiTM) developed for protocols such as secure shell (SSH) or secure sockets layer/transport layer security (SSL/TLS).

Component 102 may be implemented as a hardware component comprising a circuit, a software component executing a software program, or as a firmware component comprising both hardware and software elements. Client 101 and server 105 generally represent computers or processing devices operated by respective users or organizations that are coupled together through a client-server network, such as a local area network (LAN), wide area network (WAN), metropolitan area network (MAN), Internet Protocol (IP) network, cloud network, or any combination of such networks. The network could include different types of links, such as wired links or wireless links. Each device or network element may represent a node in the network and is coupled to at least one or more other nodes for transmission of messages (data packets) in accordance with defined routing protocols. In an embodiment, client 102 may be remote computer or portable device (e.g., laptop/notebook computers, tablet computer, mobile phone, and so on), while the server may be a server computer in the network. Embodiments are not so limited, however, and other network topographies are also possible.

In general, SSH is a cryptographic network protocol for using network services securely over an unsecured network by using public key encryption to authenticate remote computers to users. SSH connects clients to servers using a layered protocol suite comprising the main components of: a transport layer that provides server authentication, confidentiality, and integrity; a user authentication protocol that validates the user to the server; and a connection protocol that multiplexes the encrypted tunnel into multiple logical communication channels. SSH is used for a variety of different applications, including remote login operations, file transfers, and even virtual private network (VPN) implementation.

Similarly. SSL (Secure Sockets Layer), which was succeeded by TLS (Transport Layer Security), are protocols for establishing authenticated and encrypted links between networked computers.

In an embodiment, the MiTM component 102 could be included in a zero trust network access (ZTNA) gateway. In this case, component 102 could utilize client information collected by a ZTNA controller and then determine a risk level of the client based on this information. In addition, the MiTM included in a ZTNA gateway could further enhance the security of the connection by avoiding being attacked by another MiTM, such as through a MiTM attack where an attacker inserts itself between a client and server and steals or corrupts data transmitted between them.

In general, ZTNA is used to provide secure remote access to an organization's applications, data, and services based on clearly defined access control policies. A ZTNA network grants access only to specific services or applications, and thus differs VPNs where access is granted to an entire network. With ZTNA, access to network resources is granted only after the user has been authenticated to the ZTNA service. Once authenticated, the ZTNA then grants the user access to the specific resource using a secure, encrypted tunnel (e.g., SSH or SSL/TLS) which offers an extra layer of security protection.

Figure 2:
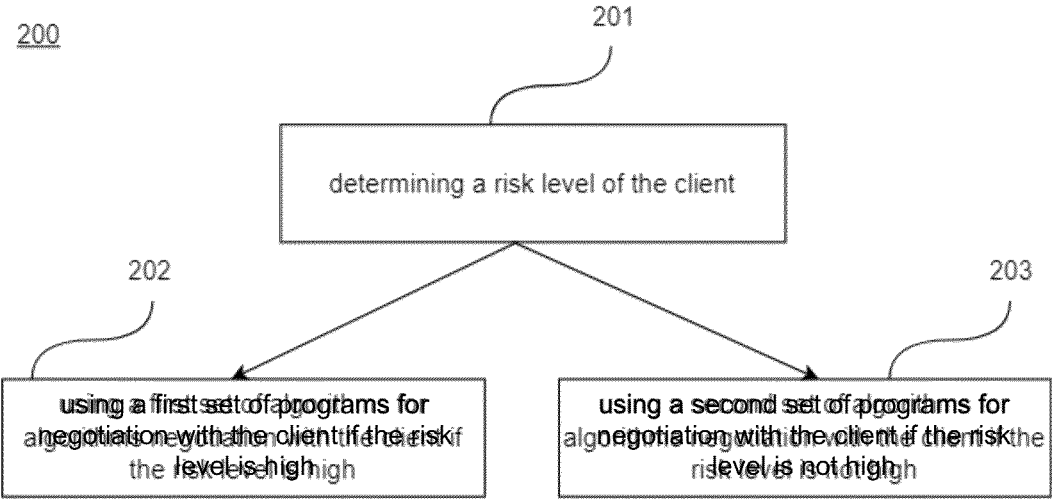
FIG. 2 is a flowchart illustrating a method for controlling network access, under some embodiments.

FIG. 2 is a flowchart illustrating a method for controlling network access, under some embodiments. This method in illustration 200 may be performed by component 102 as illustrated in FIG. 1. In block 201, component 102 first determines a risk level of the client 101. In an embodiment, determining a risk level of the client comprises determining both a user risk level of the client, and a device risk level of the client. The risk level of the client is high if either the user risk level or the device risk level is high. Otherwise, if both the user risk level and the device risk level are not high, the risk level of the client is not high.

For example, if a user is using portable storage devices and copying documents from the client device, the user risk level is high. Similarly, if the user is downloading a large amount of data from server 105 or is logging in remotely or outside the internal network, the user risk level is high. Other high risk situations include if the client's device is not installed with antivirus software or not updated with the latest security patch, the device risk level is high. In another example of device configuration, if the device is not screen locked, the device risk level is high. These examples serve as illustrations of different scenarios that could be considered as high user or device risk level and other scenarios that could be considered as high user or device risk level are also possible.

In an embodiment, all the information used for determination of risk level, such as in the above examples could be acquired by software configured at client 101.

In block 202, if the risk level of the client is high, component 102 uses a first set of programs for negotiation with client 101. The first set of programs include features that implement high level security access.

In general, programs are typically made available and installed throughout various different versions (e.g., version 1.0, 1.1, . . . 2.0, etc.) according to vendor practices. As programs evolve through updates, bug fixes, re-versioning, and so on, newer versions are released, or older versions are updated through patches, and so on. Since many improvements to programs usually involve upgrading security features in the face of ever-changing cyberattack threats, old program versions are usually lacking in certain features, improvements, and so on, which may affect the security of the application and its data.

In general, therefore, the newer the programs, the higher the security level. Put another way, older versions lower the security level. In the embodiment of FIG. 2, the first set of programs 202 consists of new or current programs and no outdated or older version programs. In this way, component 102 will communicate with client 101 using new programs, which enables a secured communication between component 102 and client 101.

In block 203, if the risk level of the client is not high, component 102 uses a second set of programs for negotiation with client 101. The second set of programs includes programs with high security level (e.g., new versions) and programs with low security level (e.g., older versions). For example, the second set of programs may include a full range of different programs to accommodate different clients. With such a flexible setting, clients with any version of software and programs could communicate with component 102. This provides certain usability and flexibility benefits, but does possibly decrease the security integrity of the system.

After block 202 or block 203, client 101 further establishes connections with component 102 through standard processes of relevant protocols such as SSH protocol or SSL/TLS protocol. Component 102 acts as a proxy client 104 to establish connections with server 105. Because server 105 is within the internal network and is less likely to be attacked by threats, component 102 may, by default, use the second set of programs for negotiation with server 105. In this way, component 102 could accommodate servers of a broad range of different versions of software, which again enables efficient and flexible connections with servers, but ostensibly without compromising network security. If server 105 requires extra security or is configured as high security, component 102 would use the first set of programs for negotiation with server 105. A list of servers requiring extra security can be configured at component 102. Component 102 can check whether server 105 is within this list to determine whether to use the first set of programs or the second set of programs for negotiation with server 105.

This process of establishing connections between component 102 and server 105 serves as an example embodiment and it is not meant to limit the scope of protection. It should be understood that this process is additional to the process of illustration 200, and it can be replaced by equivalent alternatives.

As illustrated in FIG. 2, the first or second set of programs is used in a negotiation between the server and client depending on the risk level (i.e., high or not high). In general, the negotiation process is used to propose and establish one or more programs (algorithms) between SSH/ TLS client and server to utilize for secure communications. For example, a client may send algorithms "A, B, C, D, E" as proposal, then server may send algorithms "A, C, D, E. F" as proposal, then after algorithms negotiation they will decide to use "A, C, D, E".

Under SSH and similar protocols, various different communication algorithms are supported. The client and server negotiate the communication protocol, and use a key exchange algorithm (e.g., Diffie-Hellman, DH) to generate the same session key and session ID. An SSH connection thus implicates the use of several algorithms that, together, make the connection secure. There are several encryption, data integrity, key exchange, public key and compression algorithms to select and negotiate. These choices are made between the client and the server during a key exchange process that occurs immediately after a connection with the server is made. It also may also occur during a session at regular intervals determined by the server. An encryption algorithm and a key is negotiated during the key exchange. When encryption is in effect, all data, including metadata (like packet lengths and padding fields) will be encrypted with the given algorithm.

In an embodiment, the programs or software that is negotiated comprise the algorithms that are used for SSH/ TLS communication protocols, and maybe referred to as "algorithms" or as "programs." The negotiation process thus involves the algorithms to control the secure connection establishment, and may or may not include other parts of the SSH/TLS software. In an embodiment, the MiTM component 102 is a combination of SSH client and server program (or software) that may contain many algorithms including new and old, secure and not secure.

During the negotiation, the server and the client send negotiation packets to each other, and based on the received packets, the server and the client figure out the algorithms to be used. If the negotiation of any type of algorithm fails, the negotiation fails and the server tears down the connection with the client. When many possible algorithms are involved, the client and server decide together on which to use using a simple ordered list system. For each algorithm category, the client and server exchange a list of algorithms they support and want to use in order of preference. The chosen program will be the first one that appear in both lists.

In an embodiment, the negotiation proceeds with the server sending an SSH protocol and version to the client and the client responds accordingly. The connection will shut down immediately if the two sides do not support each other. After this is the key exchange, which generates a shared key to encrypt the communication between both sides with symmetric encryption. The server sends a proposal of algorithms to the client and the client responds accordingly. In an embodiment, the proposal contains the following elements:

(1) Key exchange algorithm, e.g.: elliptic curve, Diffie-Hellman with group exchange and Diffie-Hellman with specific group; these are three types of key exchanges processes and each type has many algorithms;

(2) Public key algorithm, e.g.: elliptic curve, RSA, DSA, these are three types of key exchange algorithm, each type has many algorithms;

(3) Encryption algorithm: this is the symmetric encryption algorithms such as 3des-cdc, aes128-ctr, aes192-ctr and so on;

(4) Integrity algorithm to confirm the communication data is not tampered, and is actually a hash algorithms with a key (password), such as hmac-sha2-256, hmac-sha2-512, hmac-sha1 and so on; and (5) Compression algorithms to compress the communication data such as zlib and zlib@openssh.com.

If the client and server find algorithms of each type in common, the SSH connection is established and used. A specific example of negotiated elements corresponding to A, B, C, D mentioned above may comprise, for key exchange process (kex):

kex: diffie-hellman-group-exchange-sha256, host key algorithm: ecdsa-sha2-nistp256 kex: host key algorithm: ecdsa-sha2-nistp256 kex: server→client cipher: acs128-ctr MAC: hmac-sha2-256 compression: none kex: client→server cipher: aes128-ctr MAC: hmac-sha2-256 compression: none Although the above description mentions certain specific data elements, programs, configurations, and values, embodiments are not so limited, and any other elements and values may also be used. The key exchange process is thus used to generate a shared key for encryption of the client-server channel, and not direct exchanging of a key.

In an embodiment, the MiTM component 102 uses a first set and second set of algorithms for different clients. The first set contains a full range of programs (algorithms) in all types, such as: key exchange, public key, encryption, integrity and compression; and the second set contains more secure algorithms in all types, such as: key exchange, public key, encryption, integrity and compression.

Figure 3:
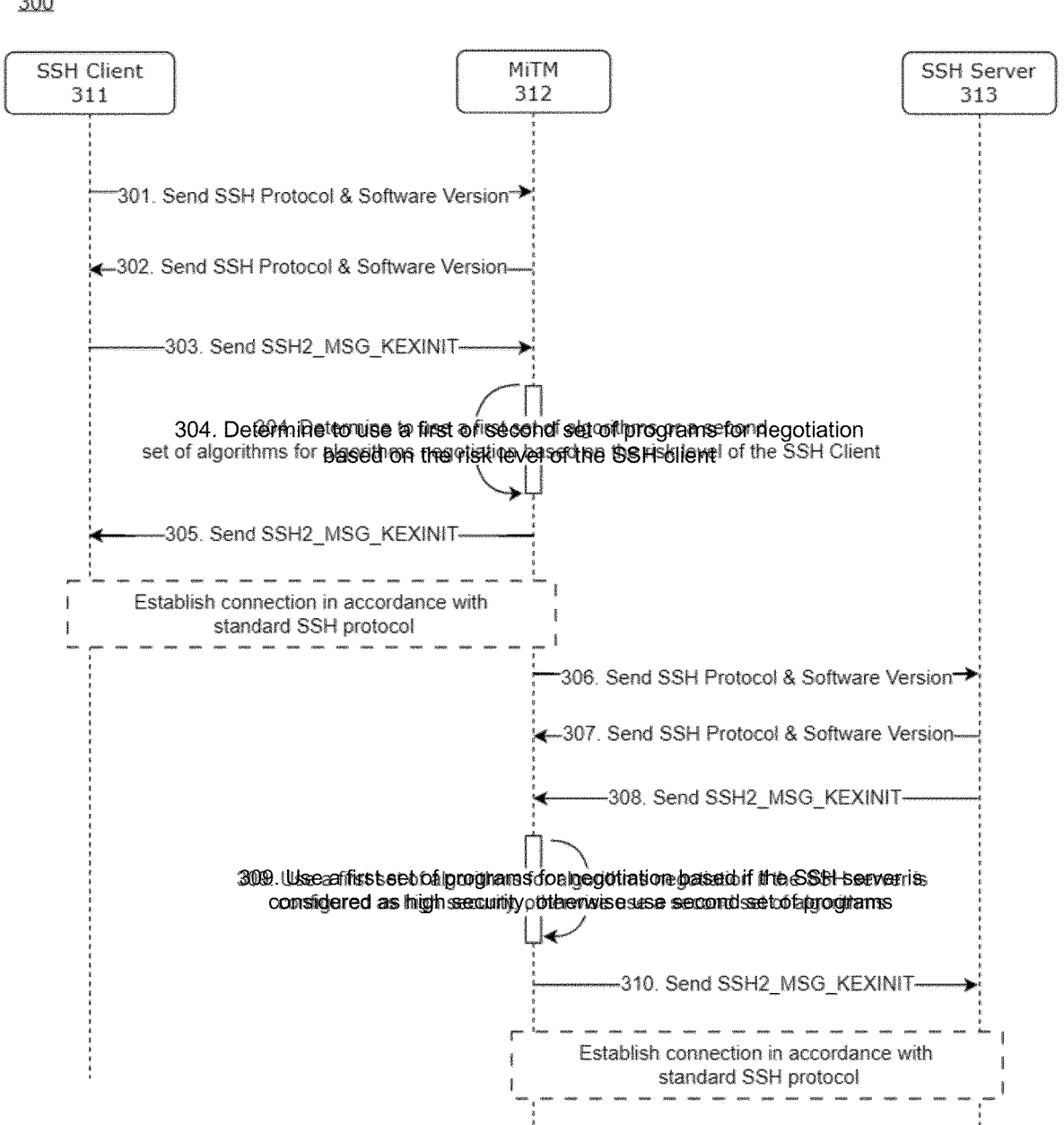
FIG. 3 is a SSH protocol diagram illustrating establishing SSH connection by a MiTM configured between a client and a server, under an example embodiment.

The negotiation process will be further described below with reference to FIG. 3 and FIG. 4, and with respect to different network security protocol implementations. FIG. 3 is a SSH protocol diagram illustrating establishing SSH connection by a MiTM configured between a client and a server, under an example embodiment. It should be noted that illustration 300 is an example of implementing this invention and is not meant to limit the scope of protection.

In illustration 300, MiTM 312 is an example of component 102 and is configured between SSH client 311 and SSH server 313. MiTM 312 enables network connection between SSH client 311 and SSH server 313, even if SSH client 311 and SSH server 313 are installed with different versions of software, by serving as a proxy between them and providing different sets of programs for negotiation.

In step 301, SSH client 311 sends its SSH protocol and software version to MiTM 312. In step 302, MiTM 312 sends its SSH protocol and software version back to SSH client 311. In step 303, SSH client 311 initiates negotiation by sending a SSH2_MSG_KEXINIT message (or similar) to MiTM 312, which indicates the programs proposal of SSH client 311. In step 304, MiTM 312 determines to use a first set of programs or a second set of programs, based on the risk level of the SSH client, for negotiation. The risk level of the client is high if either the user risk level or the device risk level is high. Otherwise, if both the user risk level and the device risk level are not high, the risk level of the client is not high. For example, if a user is using portable storage devices and copying documents from the client device, or downloading large amounts of data from server 105, or is logging in offsite or outside the internal network, the user risk level is high. Similarly, if the client's device is not installed with antivirus software or not updated with security patch, or if the device is not screen locked, the device risk level is high. In step 305, MiTM 312 sends the message SSH2_MSG_KEXINIT to SSH client 311, which indicates the first set programs or the second set of programs as its proposal for negotiation. The establishment of the SSH connection between SSH client 311 and MiTM 312, after step 305, may be completed in accordance with the standard protocol process of SSH.

After a connection with SSH client 311 has been established, MiTM 312 acts as a proxy client and initiates connection with SSH server 313. In step 306, MiTM 312 sends its SSH protocol and software version to SSH server 313. In step 307, SSH server 313 sends its SSH protocol and software version to MiTM 312. In step 308, SSH server 313 sends message SSH2_MSG_KEXINIT to MiTM 312 to initiate negotiation. In step 309, MiTM 312 uses the second set of programs as default programs for negotiation. If SSH server 313 is within a list of servers which are configured as high security, MiTM 312 uses the first set of programs for negotiation. In step 310, MiTM 323 sends SSH2_MSG_KEXINIT to SSH server 313, which indicates the second set of programs or a first set of programs as its proposal for negotiation. The SSH connection between MiTM 312 and SSH server 313, after step 305, may then be completed in accordance with the standard protocol process of SSH.

Figure 4:
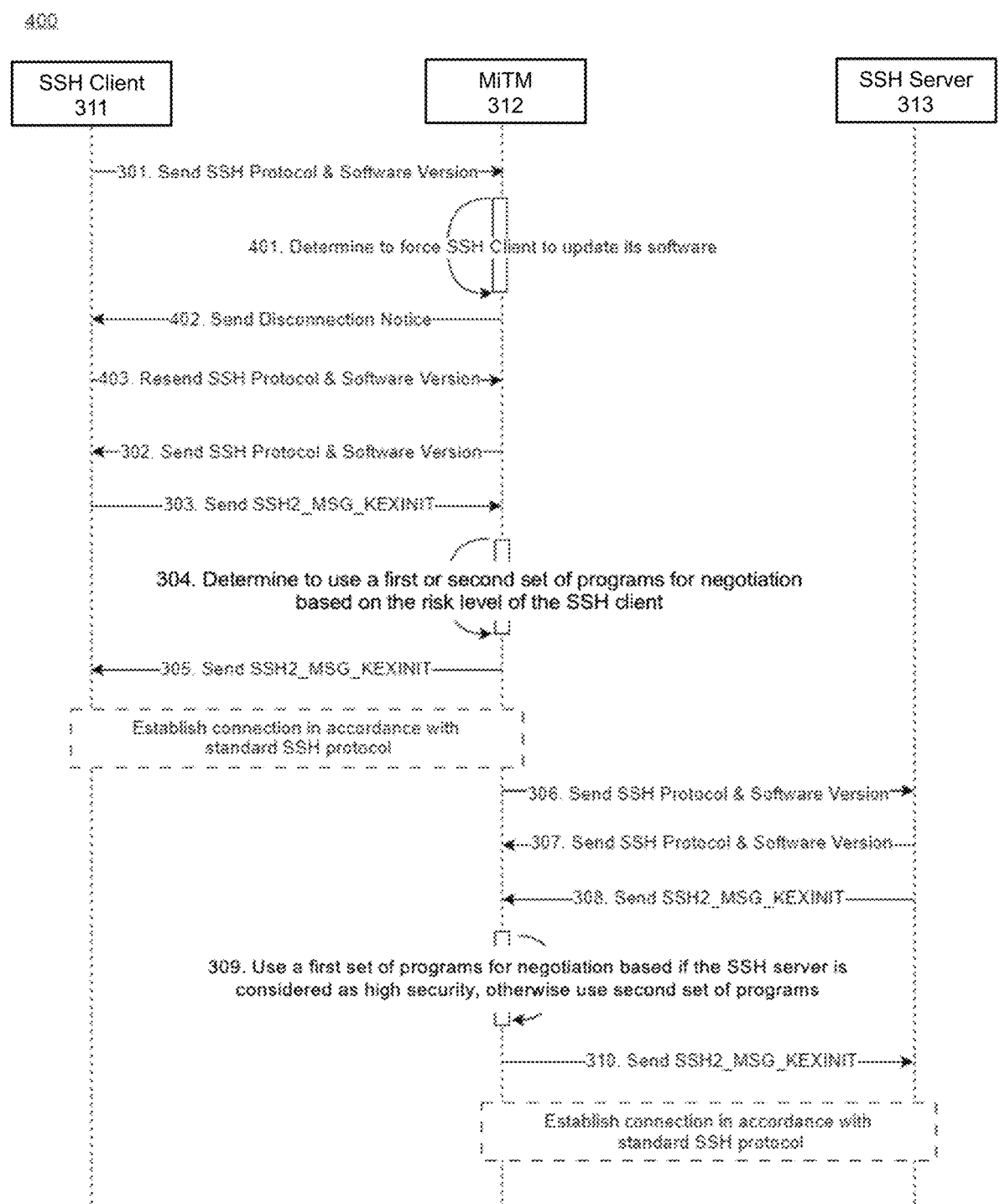
FIG. 4 is a SSH protocol diagram illustrating establishing SSH connection by a MiTM configured between a client and a server, under another example embodiment.

FIG. 4 is a SSH protocol diagram illustrating establishing SSH connection by a MiTM configured between a client and a server, under another example embodiment. It should be noted that illustration 400 is an example of implementing this invention and is not meant to limit the scope of protection.

In illustration 400, MiTM 312 is an example of component 102 and is configured between SSH client 311 and SSH server 313. MiTM 312 enables a network connection between SSH client 311 and SSH server 313, even if SSH client 311 and SSH server 313 are installed with different versions of software, by serving as a proxy between them and potentially providing different sets of programs for negotiation. In addition, MiTM 312 can force SSH client 311 to update its software version if it is outdated. In this way, SSH client's 311 SSH connection request has a high success rate without compromising on security.

In illustration 400, steps 401 to 403 are executed between step 301 and step 302, as shown, where steps 301 to 310 have been described above with respect to FIG. 3. In step 401, MiTM 312 decides whether to force SSH client 311 to update its software after receiving a first message indicating the SSH protocol and software version, from SSH client 311. In an example, MiTM 312 compares SSH client's 311 software version to a list of software versions configured at MiTM 312 to see whether or not the software version is outdated. In general, each software version is associated with a set of programs available for negotiation, and an outdated software version is associated with outdated programs. The older the software version, the more unsecure the SSH connection.

In step 402, MiTM 312 sends a second message comprising a disconnection notice to SSH client 311 to disconnect with SSH client 311 if the SSH client's 311 software version is outdated. The second message indicates the reason for disconnection as the software version being outdated. Thus, SSH client 311 knows the reason and can update its software to a newer version before trying to connect again. MiTM 312 will not send the disconnection notice to SSH client 311 if SSH client's 311 software version is not outdated, and steps 402 and 403 will not be executed in this case. If executed, in step 403, SSH client 311 resends its SSH protocol and software version to MiTM 312 after updating its software to a newer version. In this way, SSH client 311 requests to connect with MiTM 312 again. After step 403, MiTM 312 sends its SSH protocol and software version to SSH client 311 to continue the connecting process in steps 302 to 310, as described above for illustration 300 of FIG. 3.

FIGS. 2 and 3 illustrate embodiments in which the security protocol comprises SSH protocol. Embodiments are not so limited, and other protocols may be used such as SSL/TLS, or any other similar protocol.

Figure 5:
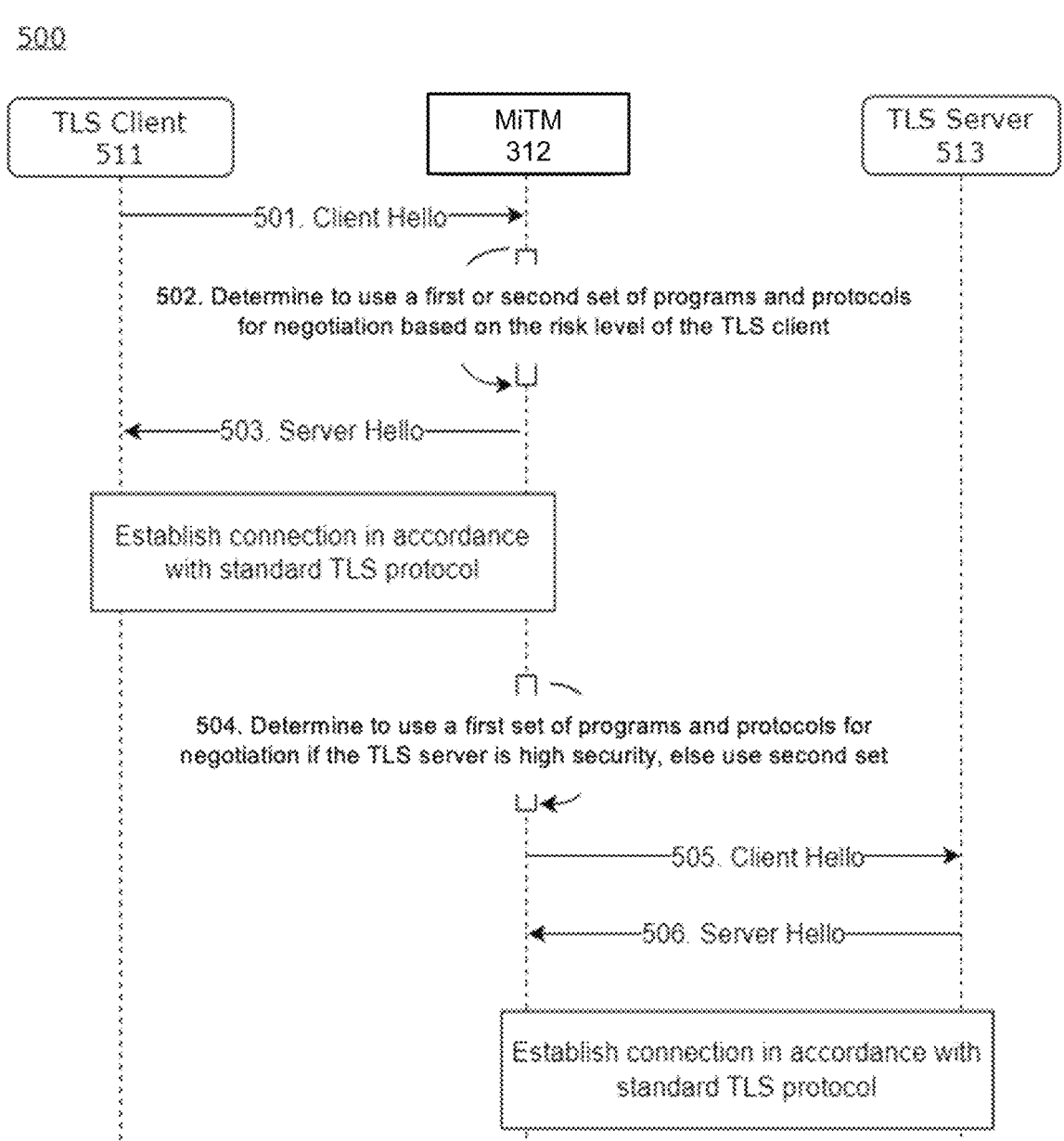
FIG. 5 is a SSL/TLS protocol diagram illustrating establishing SSL/TLS connection by a MiTM configured between a client and a server, under an example embodiment.

FIG. 5 is a SSL/TLS protocol diagram illustrating establishing SSL/TLS connection by a MiTM configured between a client and a server, under an example embodiment. Illustration 500 provided for purposes of example and is not meant to limit the scope of protection. In illustration 500, MiTM 312 is an example of component 102 and is configured between TLS client 511 and TLS server 513. MiTM 312 enables network connection between TLS client 511 and TLS server 513, even if TLS client 511 and TLS server 513 are installed with different versions of programs and TLS protocols, by serving as a proxy between them and potentially providing different sets of programs and protocols for TLS negotiation.

In step 501, TLS client 511 sends a Client Hello message to MiTM 312, which indicates TLS client's 511 versions of programs (or cipher suites) and versions of TLS protocols. In step 502, MiTM 312 determines to use a first set of programs and TLS protocols or a second set of programs and TLS protocols for negotiation based on the risk level of the TLS client 511. In an embodiment, determining the risk level of the clients in 500 proceeds as described above with respect to FIGS. 3 and 4.

If the risk level of TLS client 511 is high, MiTM 312 uses a first set of programs and protocols for negotiation with TLS client 511. The first set of programs and protocols includes programs with high security level and TLS protocols with high security level. In general, the newer the programs and TLS protocols, the higher the security level. In one example, the first set of programs and TLS protocols consists of new programs and TLS protocols with no outdated programs or TLS protocols. If the risk level of TLS client 511 is not high, MiTM 312 uses a second set of programs and protocols for negotiation with TLS client 511. In one example, the second set of programs and protocols includes a full range of different programs and TLS protocols to accommodate different clients.

In step 503, MiTM 312 sends a Server Hello message to TLS client 511, which indicates MiTM's 312 programs and versions of TLS protocols. TLS client 511 and MiTM 312 can then establish a connection in accordance with standard TLS protocol. In step 504, MiTM 312 decides to use a first set of programs and protocols for negotiation if the TLS server 513 is configured as high security. Otherwise, MiTM 312 uses a second set of programs and protocols for negotiation.

In step 505, MiTM 312 sends a Client Hello message to TLS server 513, which indicates MiTM's 312 choice of programs and TLS protocols. In step 506, TLS server 513 responds by sending a Server Hello message to MiTM 312, which indicates TLS server's 513 programs and versions of TLS protocols. MiTM 312 and TLS Server 513 can then establish a connection in accordance with standard TLS protocol.

Figure 6:
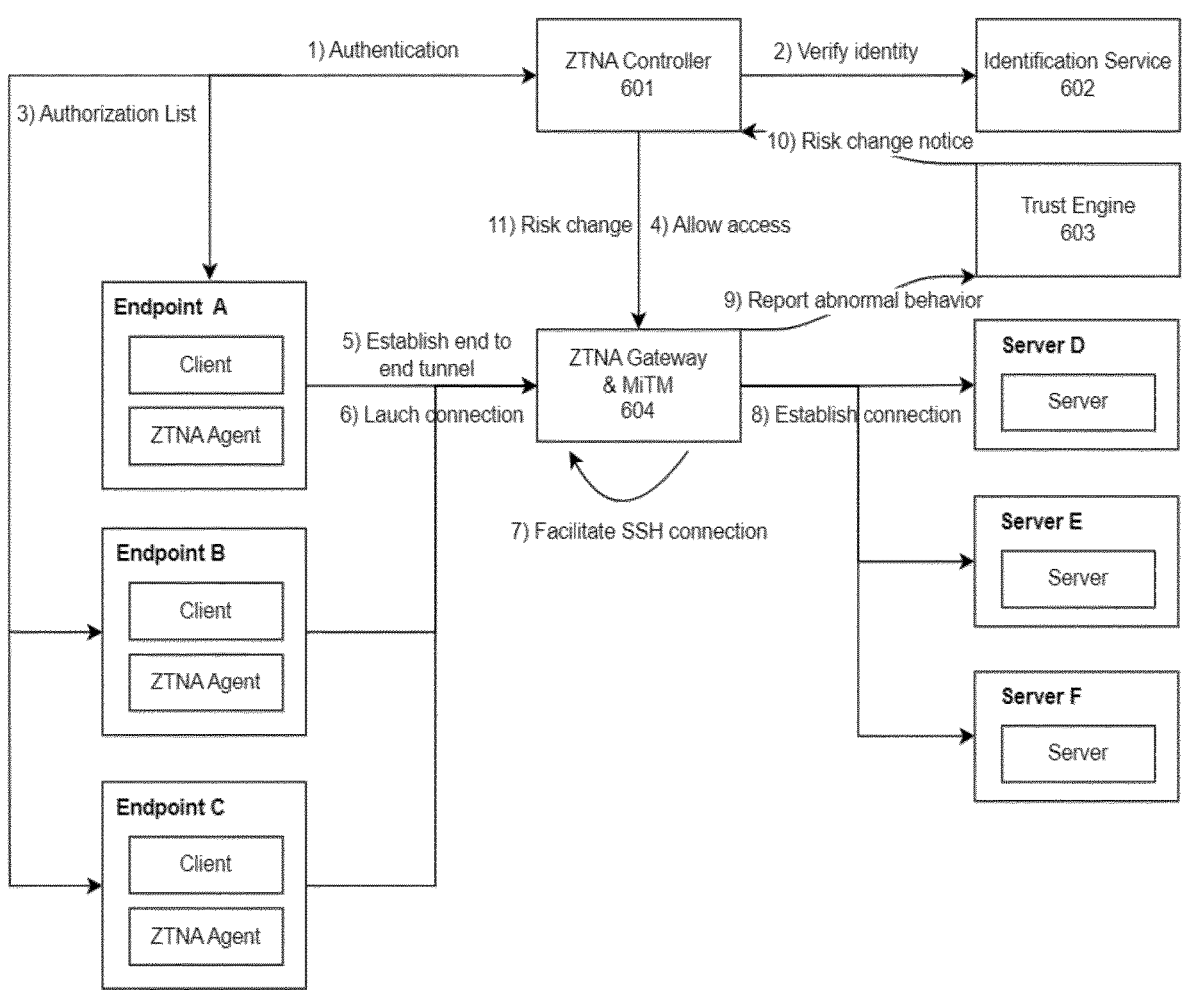
FIG. 6 is a diagram illustrating including a MiTM component in a zero trust network access (ZTNA) gateway, under some embodiments.

As mentioned above, embodiments of component 102 may be used in a zero trust network access (ZTNA) system. FIG. 6 is a diagram illustrating an example embodiment where component 102 is included in a zero trust network access (ZTNA) gateway, under some embodiments. In illustration 600, component 102 acting as MiTM, can acquire all the information used for determination of risk level via ZTNA gateway 604. In addition, component 102 reports an abnormal event to a trust engine associated with the ZTNA gateway to assist in determining, by trust engine 603, whether a rise of the risk level of client 101 occurred. If the ZTNA gateway 604 received a message indicating a rise of the risk level of client 101 from a ZTNA controller 601, component 102 sends a disconnection notice to client 101.

The example illustration 600 of FIG. 6 shows three clients: Endpoint A, Endpoint B, and Endpoint C. Each endpoint sends its authentication request (in step 1 Authentication) to ZTNA controller 601. ZTNA controller 601 verifies (in step 2 Verification) each client's identity via identification service 602. Once the authentication goes through, ZTNA controller 601 sends an authorization list (3) to each client. The authorization list indicates services or servers that each respective client can access. At the same time, ZTNA controller 601 sends a notice to ZTNA gateway 604 to allow access for clients (in step 4 Allow access). The clients then establish an end-to-end tunnel with ZTNA gateway 604 (step 5) and launch a connection (step 6).

ZTNA gateway 604 acts like component 102, namely as a proxy between a client and server to facilitate connection (step 7) between clients and servers in the system. After a connection to a server is established (step 8), the ZTNA gateway 604 can monitor clients' behavior. If there is an abnormal behavior such as cleanup after illegally accessing a server or deleting important files using command (e.g., using "rm-rf"), the ZTNA gateway 604 reports (step 9) this abnormal behavior to trust engine 603 which is associated with ZTNA gateway 604. Trust engine 603 analyzes this abnormal behavior to see whether or not this behavior causes a change of risk level of the relevant client. If a change of risk level occurs, trust engine 603 sends a risk change notice (step 10) to ZTNA controller 601. ZTNA controller 601 forwards this risk change notice to ZTNA gateway 604 to inform the risk change of the relevant client. ZTNA gateway 604 can then send a disconnection notice to the relevant client to disconnect from it. In this way, ZTNA gateway can respond to unsecure behavior in real time and avoid further loss by disconnecting the relevant client.

As described above, embodiments include a component that acts as a client or server proxy and utilizes certain secure network protocols and zero trust network access mechanisms to flexibly implement network access control. Such a component may be implemented as a computer implemented software process, or as a hardware component, or both in a computing device such as gateway 604 in FIG. 6. As such, it may be an executable module executed by the one or more computers in the network, or it may be embodied as a hardware component or circuit provided in the system. The network environment of FIG. 6 may comprise any number of components coupled over the Internet or similar large-scale network or portion thereof. Each node in the network(s) comprises a computing device capable of executing software code to perform the processing steps described herein.

Figure 7:
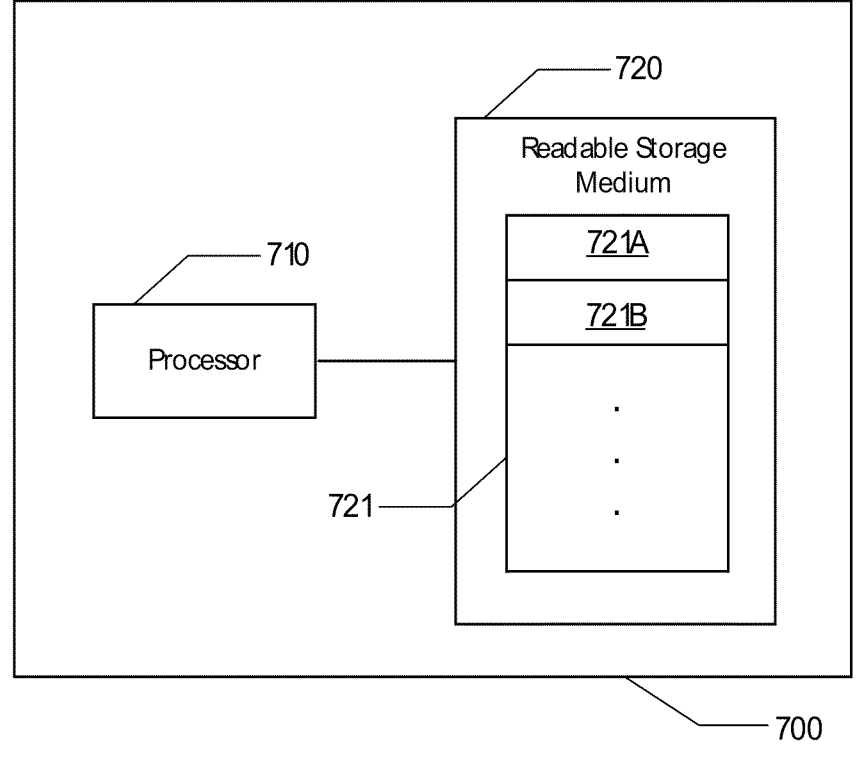
FIG. 7 is a block diagram of an apparatus for controlling network access, under some embodiments.

FIG. 7 is a block diagram of an apparatus 700 for controlling network access, under some embodiments. As shown in FIG. 7, apparatus 700 includes a processor 710 and a computer-readable storage medium 720. Processor 710 is one of the specific embodiments of component 102. Other components, such as input/output (I/O) interfaces, buffers, power circuits, and so on, may also be used as known by those of ordinary skill in the art. The apparatus 700 may be configured to perform any or all of the methods described above with reference to FIGS. 1 to 6.

Processor 710 may include, for example, general purpose microprocessors, instruction set processors and/or associated chipsets and/or reconfigurable processors and/or special purpose microprocessors (for example, application specific integrated circuits (ASICs)), and the like. Processor 710 may also include an on-board memory for cache usage. Processor 710 may be a single processing unit or a plurality of processing units for performing different actions of the method flow according to the embodiments of the present disclosure described with reference to FIGS. 1 to 6.

The computer-readable storage medium 720 may be any medium that may contain, store, communicate, propagate, or transport program instructions. For example, readable storage medium 720 may include but are not limited to electrical, magnetic, optical, electromagnetic, infrared, or semiconductor systems, apparatus, devices, or propagation medium. Specific examples of readable storage medium include a magnetic storage device such as a magnetic tape or a hard disk (HDD), an optical storage device such as a compact disc (CD-ROM), a memory such as a random access memory (RAM) or a flash memory, and/or wired/wireless communication link.

Computer-readable storage media 720 may include a computer program 721 that may include code/computer-executable instructions that, when executed by processor 710, cause the processor 710 to perform, for example, the method flow described above in connection with FIGS. 1 to 6 and any variations thereof.

Computer program 721 may be configured with computer program codes, including, for example, computer program modules. For example, in an example embodiment, the codes in the computer program 721 may include one or more program modules including, for example, a module 721A, a module 721B, etc. It should be noted that the division manner and the number of modules are not fixed, and those skilled in the art may use appropriate program modules or combination of program modules according to actual situations. When these program module combinations are executed by processor 710, processor 710 may perform the method flow described above in connection with FIGS. 1 to 6 and any variations thereof.

As stated above, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described herein. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an IC or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for controlling network access, executed by a component between a client and a server, comprising:
  determining a risk level of the client;
  using a first set of programs for negotiation with the client if the risk level is high, wherein the first set of programs includes programs with high security level and that only include current or new versions of the programs; and
  using a second set of programs for negotiation with the client if the risk level is not high, wherein the second set of programs includes programs with high security level and programs with low security level and that include at least one or more old or outdated versions of the programs so as to facilitate flexibility of program use to accommodate different clients.

2. The method of claim 1, wherein the component is included in a zero trust network access (ZTNA) gateway, further comprising:
  reporting an abnormal event to a trust engine associated with the ZTNA gateway; and
  sending a disconnection notice to the client if there is a rise of the risk level of the client.

3. The method of claim 2, further comprising:
  determining, by the trust engine, whether a rise of the risk level of the client occurred or not;
  providing notification, by the trust engine, to a ZTNA controller if there is a rise of the risk level of the client; and providing notification, by the ZTNA controller, to the ZTNA gateway if there is a rise of the risk level.

4. The method of claim 1, further comprising:
  receiving a first message, indicating a software version, from the client;
  determining whether to force the client to update software if the software version is outdated; and
  sending a second message to the client to disconnect with the client, wherein the second message indicates the reason for disconnection as the software version is outdated.

5. The method of claim 1, further comprising:
  using the first set of programs for negotiation with the server if the server is configured as high security; and
  using the second set of programs for negotiation with the server if the server is not configured as high security.

6. The method of claim 1, wherein the component is a man in the middle which acts as a proxy server communicating with the client or acts as a proxy client communicating with the server.

7. The method of claim 1, wherein determining a risk level of the client comprises determining a user risk level of the client and a device risk level of the client, wherein the risk level of the client is high if either the user risk level or the device risk level is high.

8. The method of claim 7, wherein the user risk level is high if a user is using a portable storage device, downloading a large scale of data, or logging in offsite.

9. The method of claim 7, wherein the device risk level is high if a device is not installed with antivirus software, not updated with security patch, or not screen locked.

10. An apparatus for controlling network access, wherein the apparatus is between a client and a server, comprising:
  one or more hardware processors; and
  a hardware-based memory for storing one or more programs;
  wherein the one or more programs, when executed by the one or more processors, cause the one or more processors to perform operations comprising:
  determining a risk level of the client;
  using a first set of programs for negotiation with the client if the risk level is high, wherein the first set of programs includes programs with high security level and that only include current or new versions of the programs; and using a second set of programs for negotiation with the client if the risk level is not high, wherein the second set of programs includes programs with high security level and programs with low security level and that include at least one or more old or outdated versions of the programs so as to facilitate flexibility of program use to accommodate different clients.

11. The apparatus of claim 10, wherein the apparatus is included in a zero trust network access (ZTNA) gateway, and the one or more programs, when executed by the one or more processors, cause the one or more processors to perform operations further comprising:
  reporting an abnormal event to a trust engine associated with the ZTNA; and
  sending a disconnection notice to the client if there is a rise of the risk level of the client.

12. The apparatus of claim 10, wherein before determining a risk level of the client, the one or more programs, when executed by the one or more processors, cause the one or more processors to perform operations further comprising:
  receiving a first message, indicating a software version, from the client;

determining to force the client to update software if the software version is outdated; and sending a second message to the client to disconnect with the client, wherein the second message indicates the reason for disconnection as the software version is outdated.

13. The apparatus of claim 10, wherein the one or more programs, when executed by the one or more hardware processors, cause the one or more processors to perform operations further comprising:

using the first set of programs for negotiation with the server if the server is configured as high security; and using the second set of programs for negotiation with the server if the server is not configured as high security.

14. The apparatus of claim 10, wherein the apparatus is a man in the middle which acts as a proxy server communicating with the client or acts as a proxy client communicating with the server.

15. The apparatus of claim 10, wherein determining a risk level of the client comprises determining a user risk level of the client and a device risk level of the client, wherein the risk level of the client is high if either the user risk level or the device risk level is high.

16. The apparatus of claim 15, wherein the user risk level is high if a user is using a portable storage device, downloading a large scale of data, or logging in offsite.

17. The apparatus of claim 15, wherein the device risk level is high if a device is not installed with antivirus software, not updated with security patch, or not screen locked.

18. A non-transitory computer-readable storage medium storing instructions thereon that when executed cause one or more processors to:

determine a risk level of a client;

use a first set of programs for negotiation with the client if the risk level is high, wherein the first set of programs includes programs with high security level and that only include current or new versions of the programs; and use a second set of programs for negotiation with the client if the risk level is not high, wherein the second set of programs includes programs with high security level and programs with low security level and that include at least one or more old or outdated versions of the programs so as to facilitate flexibility of program use to accommodate different clients.

* * * * *